Sept. 14, 1926. 1,599,635
A. M. BRENNE
FRICTION SHOCK ABSORBING MECHANISM
Filed July 16, 1923
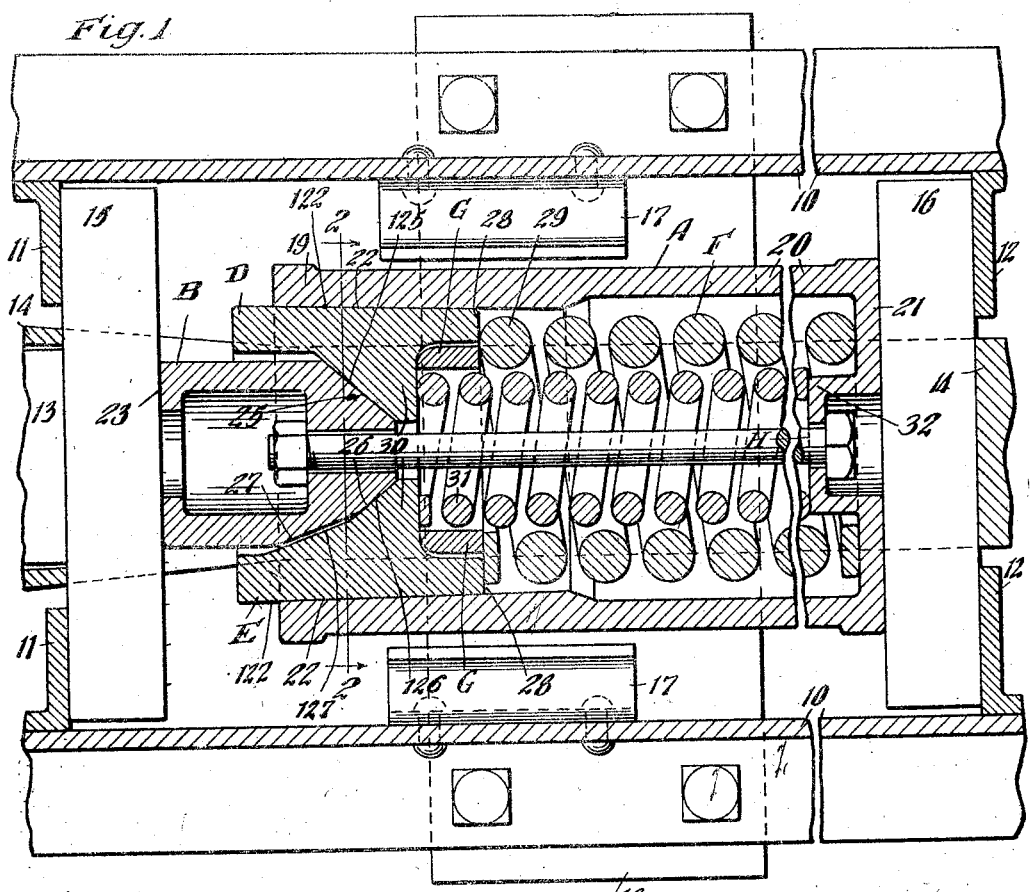
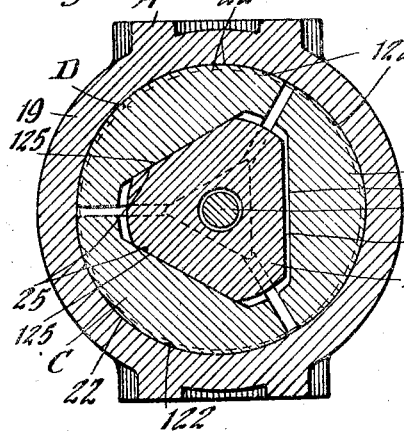
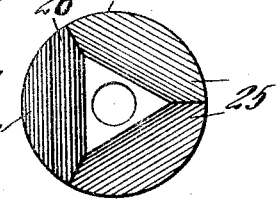
Inventor
Arild M. Brenne
By George J. Haight
His Atty Patented Sept. 14, 1926.

1,599,635

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 16, 1923. Serial No. 651,729.

This invention relates to improvements in friction shock absorbing mechanisms.

One object of the invention is to provide a friction shock absorbing mechanism adapted to cushion heavy shocks, wherein an initial action of the mechanism is had during which the resistance offered is less than during the remainder of the action, to take care of light shocks.

Another object of the invention is to provide a mechanism of the character indicated, especially adapted for railway draft riggings, wherein are employed a pressure-transmitting wedge and a plurality of wedge friction shoes co-operable therewith, with some of the engaging faces of the wedge and shoes differing in angle from each other and acting in sequence.

Other objects and advantages of the invention will more clearly appear from the description and claims hereinafter following.

In the drawings forming a part of this specification, Figure 1 is a longitudinal, sectional view of a portion of a railway draft rigging showing my improvements in connection therewith, the section through the shell and friction elements therewithin corresponding to two section planes at approximately 120° apart. Figure 2 is a vertical, transverse, sectional view corresponding substantially to the section line 2—2 of Figure 1. And Figure 3 is a detailed, rear end, elevational view of the wedge used in connection with my improved mechanism.

In said drawings, 10—10 indicate the usual draft or center sills of a car underframe, said sills being preferably of channel cross-section and to the inner faces of which are secured front stop lugs 11 and rear stop lugs 12, of usual construction. A portion of the draw-bar is indicated at 13, the same having operatively associated therewith a hooded yoke 14, of well-known form, and within which are disposed the shock absorbing mechanism proper, hereinafter described, a front main follower 15 and a rear main follower 16. The friction shock absorbing mechanism proper, illustrated in the drawings, is of that type employing a substantially cylindrical combined shell and spring cage, and in order that it may be maintained in proper central position, the draft sills may have secured to the inner faces thereof, guide plates 17—17. The yoke and parts contained therein are supported in operative position by a detachable saddle plate 18.

The improved shock absorbing mechanism proper, as shown, comprises, broadly, a combined friction shell and spring cage casting A; a pressure transmitting wedge B; three friction shoes C, D and E; a spring resistance F; a collar G; and a retainer bolt H.

The casting A is of generally cylindrical form having the friction shell proper 19 thereof formed at the open or front end. Rearwardly of the friction shell proper, the casting provides a cylindrical spring cage 20 and at its rear end, the casting A has an integral transverse wall 21 bearing on the follower 16. The friction shell proper 19, while of generally cylindrical formation, is preferably provided with three, true, independent cylindrical surfaces 22 symmetrically arranged around the axis and each of approximately 120° extent. Said cylindrical surfaces 22 are converged inwardly of the shell upon a relatively slight taper, and in such a manner that the inner ends of said three cylindrical surfaces 22 form a true circle. With this arrangement, the friction shoes, which have true cylindrical surfaces, as hereinafter described, will maintain true surface contact with the shell, in all positions during a compression stroke.

The wedge B, through which the pressure is transmitted, is in the form of a hollow casting having a front transverse bearing face 23 engaging the front follower 15. At its inner end, said wedge B is provided with a plurality of wedge faces 25, 25, 26 and 27. The wedge faces 25, 25 and 26 are all similarly inclined with reference to the axis of the mechanism and converge rearwardly of the mechanism. The face 27 forms a continuation of the face 26 but extends at a keener angle with reference to the axis of the mechanism than the face 26. Upon reference to Figs. 1 and 3, it will be noted that the faces 25, 25 and 26 are symmetrically disposed around the center or axis of the wedge, giving the outer end of the wedge the appearance of a truncated, regular triangular pyramid.

The two friction shoes C and D, preferably in the form of castings, are of like construction, each having an outer friction surface 122 which corresponds to a portion of a true cylindrical surface and which extends through an arc of approximately 120°.

At the inner end, each of the friction shoes C and D is provided with a flat face 28 adapted to bear on the front end of the larger coil 29 of the spring resistance F. On the inner side, that is the side nearest the axis of the shell, each of the shoes C and D is provided with a lateral enlargement 30, on the front side of which is provided a rearwardly and inwardly inclined face 125 corresponding in inclination to and co-operating with one of the inclined faces 25 of the wedge B as clearly shown in Figures 1 and 2.

The third or remaining friction-shoe E is provided with an outer cylindrical surface 122, and a flat bearing face 28 similar to the surfaces 122 and the faces 28 of the shoes C and D and co-operating with the shell and spring resistance in a similar manner. On its inner side, the shoe E is provided with an inwardly projecting enlargement 30 having inclined faces 126 and 127 corresponding respectively in angularity to and co-operable with the faces 26 and 27 of the wedge B. The wedge faces 125 and 126 of the shoes are so disposed that the shoes will extend a short distance outwardly beyond the end of the shell with their outer ends normally lying approximately flush with each other, and the wedge face 127 slightly spaced from the adjacent wedge face 27 of the wedge B.

The filler collar or ring G surrounds the front end of the smaller or inner coil 31 of the spring resistance and serves to hold the same properly centered, being interposed between the inwardly projecting enlargements 30 of the shoes and the outer end of the spring 29. The spring 29 has its rear end bearing on the wall 21 of the shell, and the spring 31 has its front end bearing on the enlargement 30 of the shoes and its rear end bearing on a hollow cup-like boss 32 formed integral with the end wall 21.

The retainer bolt H is anchored at its rear end within the boss 32 and at its front end within the recess of the hollow wedge B. The retainer bolt not only serves to maintain the parts in assembled relation, but also holds the spring under initial compression and may be utilized to adjust the parts to proper length and maintain them in this position when under full release.

The operation of the improved shock absorbing mechanism is as follows, assuming buffing or compressing action of the mechanism. As the wedge B is forced inwardly of the shell, the same will push the shoes inwardly and at the same time a slight wedging action will be set-up, between the relatively blunt faces 25, 25 and 26 of the wedge and the faces 125, 125 and 126 of the shoes. As the parts continue their movement inwardly of the shell, due to the taper of the shell surfaces, the shoes C, D and E approach each other relatively, which is permitted by the shoes moving toward the axis of the mechanism and inwardly with respect to the wedge B, the slippage occurring on the blunt angle faces 25, 26, 125 and 126. This differential action advances the three shoes inwardly of the shell with reference to the wedge B, until the keen wedge faces 27 and 127 come into engagement, bringing the same into action, whereupon lateral pressure on the shoes is greatly increased. As the parts continue to move inwardly of the shell there will be substantially no further slippage between the keen angle faces 27 and 127 and the shoe E will move in unison with the wedge, but due to the taper of the shell, the shoes C and D will continue to slip on the wedge causing the shoes C and D to advance longitudinally ahead of the shoe E, and the action so continues until the end of the compression stroke.

From the preceding description, it will be evident that a preliminary action of the mechanism is had while the blunt wedge faces only are functioning, during which the resistance offered is considerably less than after the keen wedge faces come into action.

The friction shell being of metal is capable of a limited amount of radial expansion, which takes place during the compression of the mechanism. The degree of taper of the shell is such that the expansion of the latter cannot neutralize the taper and therefore a differential action is assured.

Upon removal of the actuating or compressing force, there is an initial releasing action induced by the inward contraction of the shell. The forces exerted by this contraction produce a relative approach towards the center line of the mechanism of all three shoes and this in turn, causes the pressure-transmitting wedge B to be squeezed out from between the shoes, said action being facilitated by reason of the blunt angle faces 25 and 125 of the wedge B and the shoes C and D, respectively. The contraction of the shell continues until the shell has either resumed its normal condition or until the contracting forces have been reduced to a point where the energy stored up in the spring resistance exceeds the longitudinal resistance to release the same. The initial release action, just described, results in loosening the wedge B sufficiently to permit the reduction of pressure between the friction surfaces of the shoes and shell, whereupon the spring becomes effective to move all of the friction shoes outwardly of the shell, until the wedge B is limited against further movement by the bolt H, whereupon all the parts will have been restored to normal position.

I have herein shown and described what I now consider the preferred manner of carrying out the invention, but the same is merely illustrative, and I contemplate all changes and modifications that come within the scope of the claims appanded hereto.

I claim:

1. In a friction shock absorbing mechanism, the combination with a friction shell having interior, rearwardly converging friction surfaces; of friction shoes within and cooperable with said shell; a spring resistance; a wedge member co-operable with said shoes, said shoes and wedge member having cooperating faces disposed at an angle to the axis of the mechanism, the faces of said wedge member all being fixed relatively to each other, the cooperating faces of one of said shoes and wedge member comprising two sets, one set being disposed at a relatively blunt angle with reference to said axis and the other set at a relatively keen angle to said axis, said blunt and keen faces acting in sequence during a compression stroke of the mechanism.

2. In a friction shock absorbing mechanism, the combination with a friction shell having inwardly converging friction surfaces arranged circularly; of a series of friction shoes within and co-operable with said shell and arranged in a circular series; a spring resistance spreader means co-operating with said shoes, each of said shoes having a face disposed at an angle to the axis of the mechanism and co-operating with a similarly disposed face on the spreader means, and one of said shoes having an additional face also disposed at an angle to said axis and cooperating with a similarly disposed face on said spreader means, said last named co-operating face being arranged at a relatively keen angle with reference to the axis of the mechanism and the other face of said shoe and the co-operating face of the spreader means being disposed at a relatively blunt angle to said axis, said blunt and keen faces acting in sequence during the compression stroke of the mechanism.

3. In a friction shock absorbing mechanism, the combination with a friction shell having interior, converging, friction surfaces; of a series of friction-shoes within and co-operable with said shell, each of said shoes having a face extending at a relatively blunt angle with reference to the axis of said mechanism, and one of said shoes being provided with an additional wedge face extending at a keen angle to said axis; a spring resistance; and a wedge pressure transmitting member cooperable with said shoes, said member having a plurality of faces correspondingly inclined to and adapted to co-act with the blunt and keen faces of said shoes.

4. In a friction shock absorbing mechanism, the combination with a friction shell having interior inwardly converging friction surfaces; of a spring resistance; a wedge having faces extending at different angles with reference to the axis of the mechanism, certain of said faces being disposed at a relatively blunt angle with reference to said axis; a plurality of friction wedge shoes co-acting with said shell and having faces similarly inclined to and co-acting with the faces of said wedge, said blunt faces being disposed in advance of the remaining faces.

5. In a friction shock absorbing mechanism, the combination with a friction shell having interior, converging, friction surfaces; of a spring resistance within said shell; a friction wedge system co-acting with said shell friction surfaces, said system including a wedge pressure transmitting means and friction-shoes, said pressure transmitting means and shoes being provided with co-acting faces extending at relatively blunt angles and faces extending at relatively keen angles with reference to the longitudinal axis of the mechanism, said blunt faces being so arranged and disposed as to act in advance of the keen faces during a compression stroke of the mechanism.

6. In a friction shock absorbing mechanism, the combination with a friction shell having interior inwardly converging friction surfaces; of a spring resistance within the shell; a plurality of friction shoes within the shell and adapted to co-act with the friction surfaces thereof, one of said shoes being provided with a pair of faces, one of said faces extending at a relatively blunter angle with reference to the longitudinal axis of the mechanism than the other, and the remaining shoes being provided with faces extending at relatively blunt angles with reference to said axis; and a wedge pressure transmitting member having a plurality of faces correspondingly inclined to and adapted to co-act with the blunt and with the keen faces of said shoes.

7. In a friction shock absorbing mechanism, the combination with a friction shell having interior inwardly converging friction surfaces; of a spring resistance within the shell; a plurality of friction-shoes within the shell and adapted to co-act with the friction surfaces thereof, one of said shoes being provided with a pair of faces, one of said faces extending at a relatively blunter angle with reference to the longitudinal axis of the mechanism than the other and disposed in advance of the same, and the remaining shoes being provided with faces extending at relatively blunt angles with reference to said axis; and a wedge pressure transmitting member having a plurality of faces correspondingly inclined to and adapted to co-act with the blunt and with the keen faces of said shoes.

8. In a friction shock absorbing mechanism, the combination with a friction shell having converging, cylindrical, interior friction surfaces; of a spring resistance; three friction shoes arranged in a circular series, one of said shoes having a keen and a blunt wedge face, said last named face being disposed inwardly of said first named face and the remaining two shoes having blunt wedge faces; and a pressure transmitting wedging means having correspondingly inclined faces co-operable with those of the shoes.

9. In a friction shock absorbing mechanism, the combination with a friction shell having interior, converging, friction surfaces; of a spring resistance within said shell; a wedge adapted for movement inwardly of the shell, said wedge having a plurality of converging faces at the inner end thereof extending at a relatively blunt angle with reference to the axis of the mechanism and a face extending at a relatively keen angle to said axis and disposed at the same side of said wedge with one of said blunt faces and outwardly thereof; a plurality of friction shoes within the shell and adapted to co-act with the friction surfaces thereof, one of said shoes having a pair of faces extending respectively at blunt and keen angles with reference to said axis and adapted to co-act with the blunt and keen angle faces of the wedge, and the remaining shoes each having a flat face correspondingly inclined to the remaining blunt faces of said wedge and adapted to co-act therewith.

10. In a friction shock absorbing mechanism, the combination with a friction shell having interior friction surfaces converging inwardly of the shell; of a spring resistance; a plurality of friction-shoes co-operable with the friction surfaces of the shell; and pressure-transmitting wedge means co-operable with said shoes, said shoes and means all having co-operating sets of faces inclined at a relatively blunt angle with respect to the axis of the mechanism when the mechanism is in full release, said means and a shoe having also co-operable opposed faces inclined at a relatively keen angle with respect to the axis of the mechanism, said keen angle faces being ineffective when the gear is in full release but adapted to become effective as the shoes and means move inwardly of the shell during a compression stroke.

11. In a friction shock absorbing mechanism, the combination with a column-acting member having longitudinally extending friction surfaces, the effective distance between which, at their outer ends, is different from that at their inner ends; of a spring resistance; a plurality of friction-shoes having friction surfaces co-operable with the said friction surfaces of said member; and pressure-transmitting wedging means, the latter and all of the shoes having co-operating sets of faces inclined at a relatively blunt angle with respect to the axis of the mechanism and functioning actively during the initial portion of a compression stroke, said means and at least one of the shoes having additional co-operable opposed faces inclined at a keener angle with respect to the axis of the mechanism, said keener angle faces being ineffective during said initial portion of the compression stroke and automatically becoming effective thereafter as the friction-shoes travel along said friction surfaces of said member.

12. In a friction shock absorbing mechanism, the combination with a column-acting member having a plurality of longitudinally arranged friction surfaces tapered in a direction lengthwise of said member, of a spring resistance; friction-shoes co-operable with each of said friction surfaces; and a pressure-transmitting wedge having blunt angle wedge engagement with each of said shoes during the initial portion of a compression stroke and with some of said shoes during the entire compression stroke, said wedge and one of said shoes having keen angle wedge engagement after said initial portion of the compression stroke and thereafter until the end of the compression stroke.

In witness that I claim the foregoing I have hereunto subscribed my name this 13th day of July, 1923.

ARILD M. BRENNE.